US008166624B2

(12) United States Patent
Andreasen et al.

(10) Patent No.: US 8,166,624 B2
(45) Date of Patent: May 1, 2012

(54) LINEARLY EXTENDIBLE IMPACT ANCHOR DRIVING POLE AND ANCHOR SYSTEM

(76) Inventors: Jon Andreasen, Anchorage, AK (US); Anthony Patsfield, Rescue, CA (US)

( * ) Notice: Subject to any disclaimer, the term of this patent is extended or adjusted under 35 U.S.C. 154(b) by 367 days.

(21) Appl. No.: 12/351,293

(22) Filed: Jan. 9, 2009

(65) Prior Publication Data

US 2009/0183451 A1 Jul. 23, 2009

Related U.S. Application Data

(60) Provisional application No. 61/110,337, filed on Oct. 31, 2008, provisional application No. 61/021,866, filed on Jan. 17, 2008.

(51) Int. Cl.
*B23P 11/00* (2006.01)

(52) U.S. Cl. ............................... 29/254; 29/278; 29/270

(58) Field of Classification Search .................... 29/254, 29/255, 275, 270, 244, 278
See application file for complete search history.

(56) References Cited

U.S. PATENT DOCUMENTS

| | | | | |
|---|---|---|---|---|
| 4,034,594 | A * | 7/1977 | Morgan | 72/457 |
| 4,335,493 | A * | 6/1982 | Shivers et al. | 29/254 |
| 4,675,968 | A * | 6/1987 | Bartlett | 29/254 |
| 5,109,739 | A * | 5/1992 | Hull et al. | 81/463 |
| 5,245,737 | A * | 9/1993 | Perea | 29/247 |
| 6,786,116 | B2 | 9/2004 | Dockery | |
| 2009/0183451 | A1 * | 7/2009 | Andreasen et al. | 52/223.13 |

* cited by examiner

*Primary Examiner* — Lee D Wilson
(74) *Attorney, Agent, or Firm* — John P. O'Banion

(57) ABSTRACT

A linearly extendible impact anchor driving apparatus for positioning and setting a wedge anchor assembly in a pre-drilled hole extending inwardly through the ceiling or wall surface of a structure while at ground level and with a single tool. One embodiment of the apparatus has an extendible tubular housing with a coupling and anchor head at one end and a hemispherical end tip at the other. A slidable handle impacts a stop mounted to the body to impart linear force to the anchor.

11 Claims, 4 Drawing Sheets

LINEARLY EXTENDIBLE IMPACT ANCHOR DRIVING POLE AND ANCHOR SYSTEM

CROSS-REFERENCE TO RELATED APPLICATIONS

This application claims priority from U.S. provisional application Ser. No. 61/110,337 filed on Oct. 31, 2008, incorporated herein by reference in its entirety, and from provisional application Ser. No. 61/021,866 filed on Jan. 17, 2008, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to anchoring systems in buildings or other structures, and more particularly to a linearly extendible impact anchor driving pole and anchor system for installing mechanical anchors for ceiling suspended structures.

2. Description of Related Art

The attachment of electrical conduits, panels, machines, cables, straps, supports and other fixtures to masonry or concrete building structures is typically accomplished with an anchor secured within a pre-drilled bore. The masonry anchors known in the art are normally one of three types: threaded, expansion or chemical adhesive. Threaded anchors are not often suitable for use in masonry or stone because the substrate material is too brittle or too hard to allow a threaded anchor piece to tap the sides of the bore to create corresponding threads to secure the anchor. As a consequence, the self-tapping anchor cannot withstand any applied load without failing and can damage the substrate.

Chemical adhesives alone or in combination with an anchor member may be deposited in the bore and allowed to cure to secure an anchor. However, even fast acting agents require 10 to 30 minutes to set before the application of a load or any further manipulation of the anchor. The strength of the adhesive interface with the sides of the bore can also weaken over time and tensile loading of the anchor.

Expansion or wedge anchors are adapted to be introduced into a pre-drilled bore and to engage the wall of the bore with various types of expanding members which press against the walls and these anchors can be exposed to a load immediately.

Strike or impact expansion type wedge anchors are often used to anchor fixtures to concrete ceiling and support structures. The typical impact wedge anchor has a cylindrical body and an expansion wedge at the distal end of the body that will cause the body elements or a sleeve to expand upon the application of tensile forces to the wedge. These types of wedge anchors are inserted into a pre-drilled hole with one or more impacts with a hammer and then set by causing the expanding members to wedge securely into the concrete, brick or other masonry material. Impacts with a hammer are required because the expansion sleeve or body must be frictionally engaged with the sides of the bore before the radial expansion by the frustoconical portion of the anchor with the application of a load. Therefore, the outside diameter of the sleeve must be approximately the same diameter as the inside diameter of the bore.

Other expansion anchors use interior threads within the body of the anchor and a threaded member with a wedge to radially expand the body or expansion sleeve against the walls of the bore to secure the anchor. Rotation of a nut on the threaded member draws the portions of the wedge through the expansion sleeve causing it to expand radially increasing the frictional engagement of the sleeve with the walls of the bore thereby securing the anchor and increasing the load capability of the anchor. The initial setting of the anchor is accomplished through the tightening of the nut rather than by tensile load forces pulling outwardly on the anchor with these types of anchors. Accordingly, bolt expandable body type anchors that require the installation of the body in the bore first by hammering and then expanded are installed in two stages.

Still other anchors, such as split drive anchors or strike nail anchors, are set in pre-drilled holes with multiple impacts causing direct expansion of the anchor body sections against the side walls of the bore. These types of anchors are installed in a single stage.

One common use for wedge anchors is with suspended ceilings that are often used in public buildings that comprise a grid like framework and removable ceiling tiles. The framework forming the ceiling is suspended by a series of supports, typically threaded rods, attached to anchors in the building structure. The threaded rod is normally coupled to a threaded member of the anchor with a long bodied nut or threaded sleeve. Installation of the anchor requires drilling of the hole, insertion of the anchor followed by multiple impacts to the anchor to set the anchor within the hole. The use of a wrench to tighten a nut may also be needed to complete the installation of the anchor. This will often require the installer to ascend and descend a ladder multiple times to perform each task or installation step and use several different tools.

In addition, use of a hammer at the top of a ladder on an overhead horizontal surface makes it difficult to strike the anchor squarely and is also physically demanding on the worker. Inaccurate strikes can result in the bending of the anchor or distortion of the threads that can lead to mechanical failure of the anchor. Improper alignment or damaged threads of the anchor may also require replacement of the anchor or limit the nature of the load that can be attached to the anchor.

Accordingly, there is a need for an apparatus and method for reducing the time and effort necessary for the installation of each support element and anchor to a stone or masonry structure. Reducing the amount of work required or the exposure to risk at a construction site can result in significant economic savings, greatly improved efficiency, lower accident rates and improved safety records. The present invention satisfies these needs as well as others and is generally an improvement over the art.

BRIEF SUMMARY OF THE INVENTION

The present invention is an apparatus and system for efficiently installing impact anchors and associated support pieces in an overhead surface or wall of a building or other structure from ground level. The apparatus preferably includes telescoping extendible members that form an adjustable length pole with a head on one end that is configured to hold any type of conventional anchor in the proper orientation for insertion into a pre-drilled bore and then reversibly or permanently set in place. This permits the apparatus to be adjustable to the height of the workman and the height of the overhead surface, as well as allow the wedge anchor to be installed while the worker is standing at ground level. This also avoids the need for the workman to ascend a ladder to apply force to the wedge anchor with a hammer, for example, to set the anchor and then descend the ladder and move the ladder to the next location.

By way of example and not of limitation, one embodiment of the apparatus of the present invention generally comprises a telescoping pole with a head receptacle at the distal end and a hemispherical tip at the proximal end. The hemispherical end tip has an arcuate shape to comfortably fit a cupped hand for easy positioning and permits the pole to exert vertical pressure. The end tip may be metal or may also be made of rubber or similar material that is resilient.

The pole body portion, which is preferably elongated and cylindrical in shape, has a longitudinally slidable handle and at least one stop. In one embodiment, the handle is weighted to increase the force transferred from the handle to the stop and then to the pole when the handle is advanced sharply against the stop by the user.

The pole body preferably has a head receptacle that is configured to receive a wedge anchor installation head. The receptacle may also be adapted to coupling a socket wrench or other tool. Installation heads can be exchanged quickly to facilitate different sizes and types of anchors. For example, "tie wire" wedge anchors typically have a hole that a wire or cable passes through to secure the cable. In one embodiment, the anchor installation head is configured to allow the installation of the wedge anchor with a cable or wire threaded through a hole in the anchor.

In another embodiment, the installation head is configured to receive a long nut and a threaded rod that are coupled to a threaded wedge anchor or screw anchor. The apparatus can be moved vertically as well as rotated axially to advance or loosen the nut on the threads of the anchor in this embodiment.

In use, a hole is drilled into concrete or other material at a sufficient depth and diameter for installation of the type of anchor that is selected. An anchor is placed in the head of the apparatus. The extendable elements of the body of the apparatus are adjusted by the worker to the proper length to permit the anchor to be placed in the hole at the proper orientation. In one embodiment, the anchor has a conical or triangular point to facilitate the placement of the anchor in the hole in the overhead structure.

Once the anchor is placed in the opening of the hole, the sliding handle of the pole is brought up sharply against the stop and the force is transmitted along the length of the pole to the anchor causing the full insertion of the anchor and then allowing the anchor elements to expand within the hole. The expanded anchor will then be capable of bearing a load.

In another embodiment, a threaded wedge anchor is coupled to a threaded rod with a preferably hexagonal nut and the anchor may also have one or more washers. The head and telescoping body are configured to accommodate threaded rods of various lengths and the head is also sized to engage the nut and permit rotation of the nut with rotation of the pole body. The threaded rod-anchor combination is inserted into the head and telescoping pole is extended to the proper length to insert the anchor into the pre-drilled hole. The impact anchor is set with the sliding handle impacting the stop and transferring force to the anchor causing it to initially engage the interior of the hole and thereafter expand. The nut can be rotated around the threads of the anchor to tighten the nut and washer against the surface of the overhead structure. A nut can also be rotated to expand the expansion sleeve to fully set the anchor depending on the type of anchor that is used.

In one embodiment, an arm that is substantially perpendicular to the long axis of the pole body is provided to increase the torque with the axial rotation of the body. The arm increases the mechanical advantage to the user to tighten or loosen nuts etc.

According to one aspect of the invention an apparatus for setting anchors is provided that permits the proper orientation, insertion and setting of wedge anchors in pre-drilled holes from ground level and without the need for a ladder to set the anchors.

Another aspect of the present invention is to provide a tool which shortens the amount of time that is required to install each anchor and the number of tools involved in installation.

Another aspect of the invention is to provide a tool for setting anchors with precision and uniformity, particularly in areas where there are obstructions that limit the use of a hammer or ladder access.

A further aspect of the invention is to provide a tool which permits the insertion and expansion of the anchor with a relatively small application of force and at the same time protecting the anchor from damage.

Another aspect of the invention is to provide a tool that does not damage either the anchors or the surfaces of the material receiving the anchor.

Another aspect of the invention is to provide an apparatus for installing overhead anchored structures that has an extendable tubular housing with an end cap at the distal end and a coupling at the proximal end to retain an anchor head configured to hold an anchor for placement in a pre-drilled hole in a substrate and means for imparting force longitudinally on the anchor head so that the anchor is placed and set in a pre-drilled hole in a substrate.

A further aspect of the invention is to provide an apparatus with an elongate tubular housing with a coupling at the distal end retaining an anchor head having at least one longitudinal tapered channel and an anchor receptacle and a slidable member and a stop mounted to the tubular housing that is configured to slide linearly along the outside surface of the tubular housing and impact the stop.

Yet another aspect of the invention is to provide an apparatus for installing overhead anchored structures that has a telescoping tubular body with a coupling on the distal end of the tubular body that retains a collar and both the coupling and the collar have central bores open to the interior of the tubular body configured to retain an anchor assembly for placement in a pre-drilled hole in a substrate and means for imparting force longitudinally on the collar and the anchor assembly wherein the anchor is set in a pre-drilled hole in the substrate.

Another aspect of the invention is to provide a tool that will permit a worker to work alone without the use of a ladder or scaffold to install anchor assemblies and to install anchors without the use of multiple tools.

Another aspect of the invention is to provide a tool that can be used on ceilings of varying heights with a single tool that includes locking extendible elements and makes difficult places accessible for mounting anchors.

A still further aspect of the invention is a tool that can be used to introduce any type of expandable anchor into a pre-drilled hole and permanently set by linear impact forces and axial rotation of a bolt or nut with a single set of actions by the apparatus and without requiring power tools or an exchange of anchor heads.

Another aspect of the invention is to provide an apparatus that will save time, increase safety in the workplace by reducing the number of dangerous activities required of the workers, and thereby increase the profitability of the construction project.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 7. It will be appreciated that the apparatus may vary as to configuration and as to details of the parts, and that the methods of use may vary as to the specific steps and sequence, without departing from the basic concepts as disclosed herein.

Figure 1:
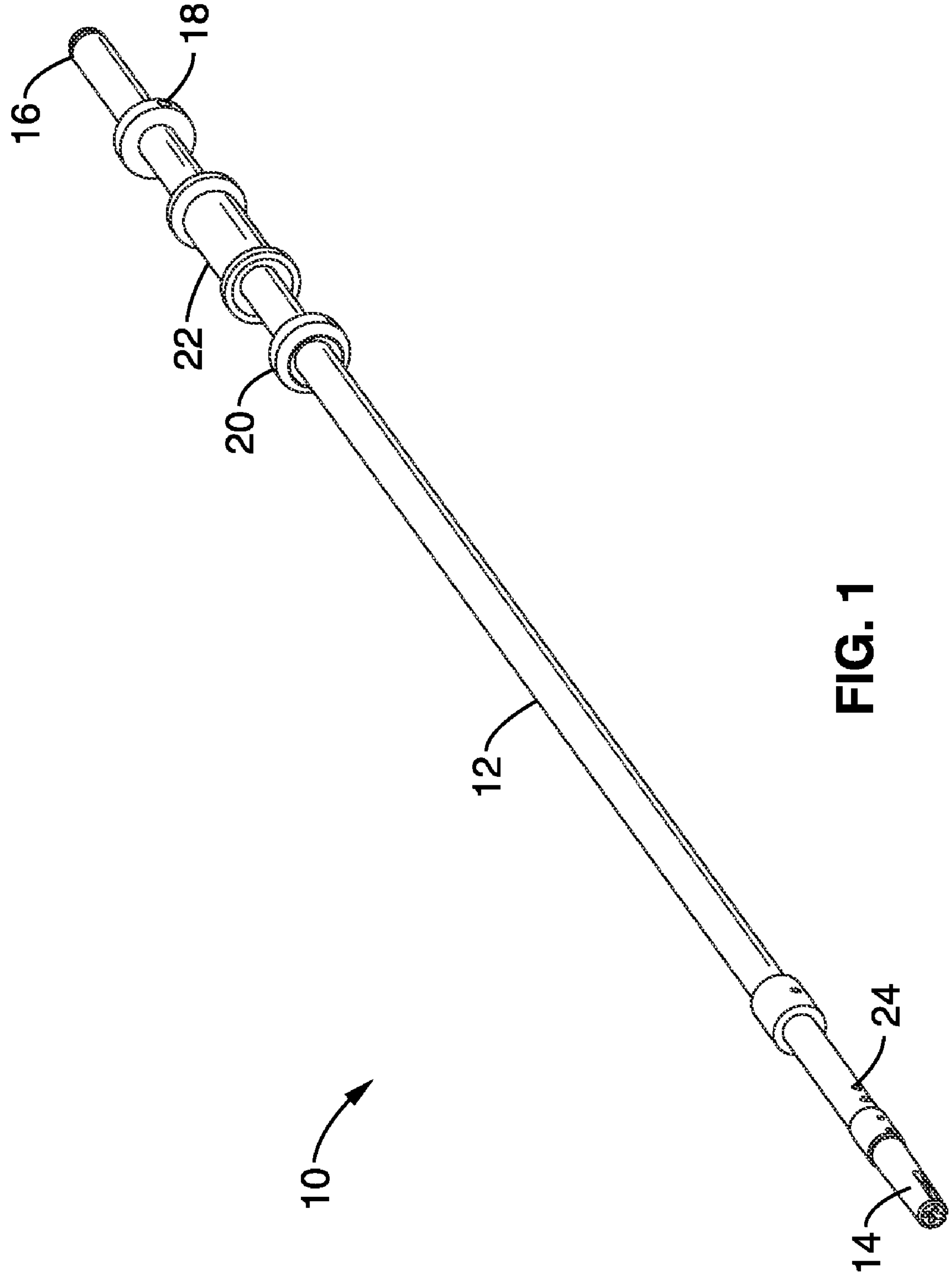
FIG. 1 is a perspective side view of one embodiment of the extendible impact apparatus according to the invention.

Referring first to FIG. 1, one embodiment of the anchor installation apparatus invention 10 is generally shown. The apparatus 10 has an elongated body 12 having an anchor head 14 at the distal end and an end cap 16 at the proximal end of the body 12. The body 12 is preferably a telescoping pole with several elements extending linearly relative to each other so that the body 12 has an adjustable length. Each telescoping section can be reversibly fixed and positioned so that the overall length of the body 12 can be determined by the user. In one embodiment, the telescoping elements can be locked in position with pins, frictional elements, threaded couplings or other locking systems known in the art. The overall length of the body 12 can also be reduced to a minimum size for transportation and storage. However, the body 12 can also be a rigid body of a single length in another embodiment.

The body 12 is preferably fabricated out of materials that are strong and resist bending significantly but are light weight such as aluminum for easy positioning as well as transportation and use. Although aluminum is preferred, it will be understood that other materials can be used that can have a generally tubular form and can resist deformation from vertical impact forces from repeated use.

The end cap 16 of body 12 is preferably hemispherical in shape so that the cap will fit comfortably in the hand of the user when the whole apparatus is in a vertical orientation. The end cap 16 can act as a pivot point for the apparatus when the anchor in the head 14 at the distal end of the body 12 is maneuvered into position to insert the anchor. The preferred hemispherical shape of the end cap 16 is designed to fit the hand of the user for control and comfort. The end cap 16 may be made of hard material such as plastic or metal or may also be made of a resilient material such as rubber.

Figure 2:
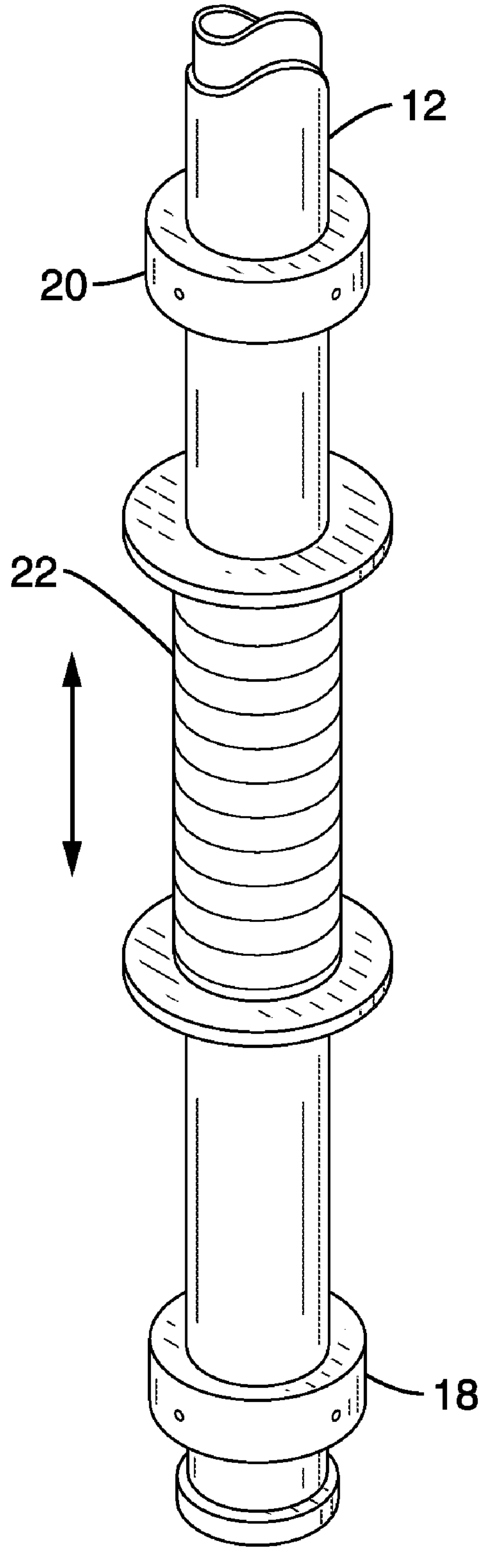
FIG. 2 is a detailed perspective side view of the slidable handle and stops on the pole of the invention shown in FIG. 1.

The base body 12 of the apparatus 10 has a top stop 20 and bottom stop 18 in the embodiment shown in FIG. 1 and FIG. 2. The top stop 20 and bottom stop 18 are configured to stop the linear movement of handle 22 along the body 12 that can move in either direction as seen in FIG. 2. In one embodiment, the handle 22 is manufactured with heavy steel or is weighted with heavy materials to give additional force to the impact of the handle with the top stop 20 during use. The distance between stop 18 and stop 20 can be changed on one embodiment to regulate the distance that the handle travels linearly along the body 12.

Figure 3:
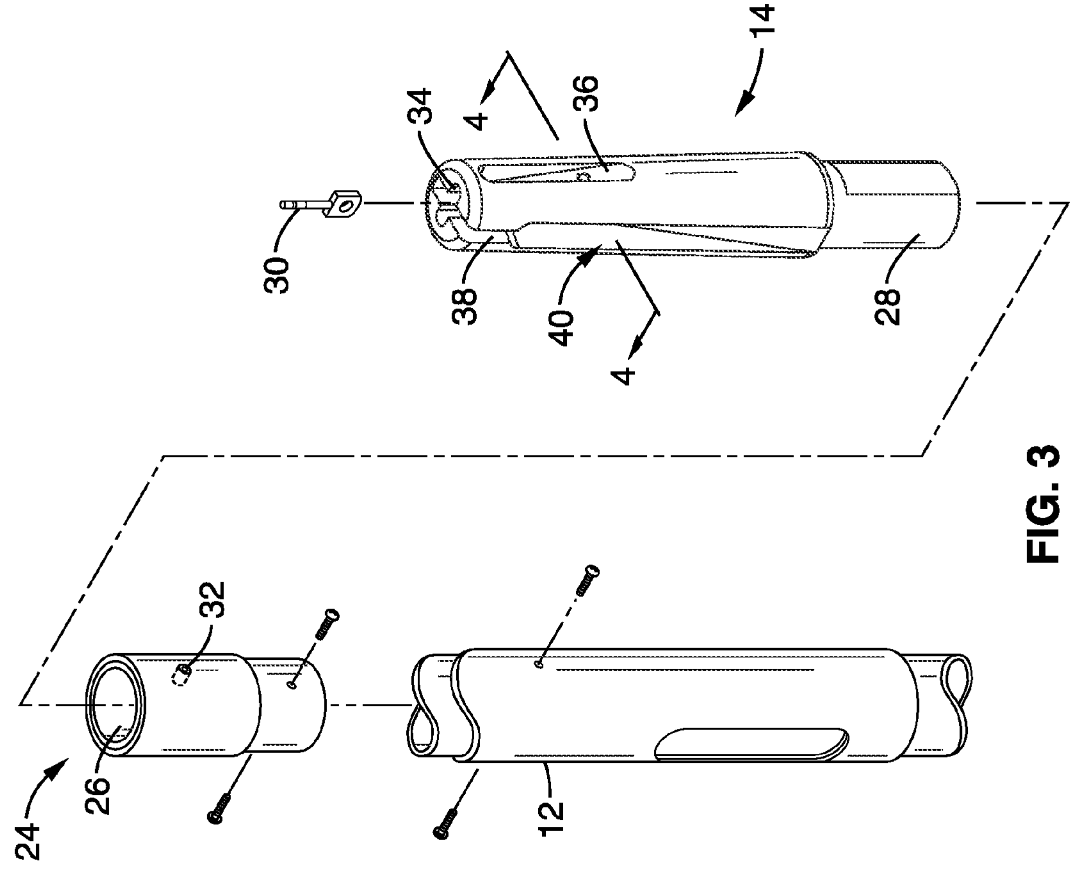
FIG. 3 is a perspective view of the detachable head element and receptacle of the embodiment shown in FIG. 1.

Turning now to FIG. 3, the distal portion of body 12 with one embodiment of the anchor head 14 and quick coupling 24 are shown in an exploded view. As seen in FIG. 1, the coupling 24 is joined to the distal end of body 12 and is configured to receive and secure the head 14, thereby making the heads interchangeable in this embodiment. In another embodiment (not shown), the anchor head 14 is permanently affixed to the distal end of body 12 and head 14 is not a separate piece.

The coupling 24 is preferably tubular and firmly mounted to body 12 of the apparatus 10. The coupling 24 has a central channel 26 that can receive the base 28 of anchor head 14 and is cylindrical in shape in the embodiment shown. In another embodiment, the channel 26 of coupling 24 and the corresponding base 28 of head 14 have geometric shaped cross-sections or a beveled side that avoid rotation of the head 14 within the coupling 24 when the whole apparatus 10 is rotated. A retention bolt 32 may also be used to secure the head 14 within the coupling 24.

The coupling of head 14 with the quick coupling 24 can be accomplished with many different methods known in the art such as a bayonet mount, a screw mount, friction mount, pins and spring or resilient members. Interchangeable heads 14 increase the efficiency of the process and permit a single workman to quickly change the type of anchor or activity that is provided by the apparatus 10.

In the embodiment of the anchor head 14 shown in FIG. 3, a key shaped wedge anchor 30 is shown that is often used as an anchor for wires, cables or straps etc. The key shaped wedge anchor 30 has a flat section with a hole to attach a wire or cable. The anchor 30 also has a cylindrical body and wedge that can expand against the walls of the pre-drilled hole in the building structure to secure the anchor. In one embodiment, anchor 30 has a conical or triangular tip so that the user has some sensory feedback from the apparatus when the anchor 30 is placed in the hole opening and is generally oriented perpendicularly to the surface of the building structure and when the anchor is ready to be installed.

The anchor head 14 embodiment shown in FIG. 3 is generally cylindrical and has a body with a coupling end 28 that is sized and shaped to correspond to the shape of the interior 26 of the coupling 24 and to be held in place with a screw 32 to restrict withdrawal of the head from the coupling 24 or rotation of the head 14 within the coupling 24.

The top of the head 14 has an anchor receptacle slot 34 to receive an anchor 30 for installation. The transverse slot 34 may also have an optional resilient finger 36 that holds the anchor in place in slot 34 as illustrated in the embodiment shown in FIG. 3 and FIG. 4. The principal purpose of the resilient finger 36 is to keep the anchor 30 properly oriented with respect to the head 14 and body 12 and the pre-drilled hole and to avoid knocking the anchor 30 out when the workman is introducing the anchor to the hole during installation.

In another embodiment, the slot 34 has a sleeve that frictionally engages the key anchor 30. The slot 34 may also be sized to fit the anchor 30 without a sleeve.

Figure 4:
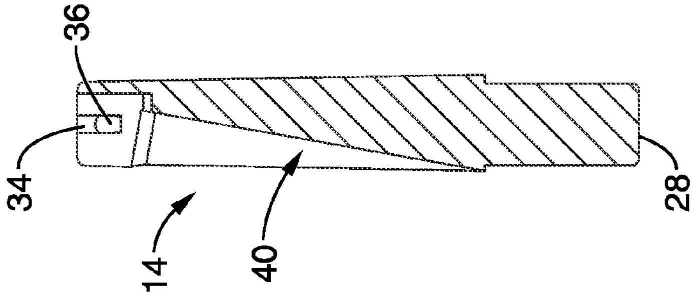
FIG. 4 is a cross-sectional view of the detachable head element and receptacle embodiment as shown in FIG. 3 taken along the lines 4-4.

Referring also to FIG. 4, the head 14 preferably includes a channel 38 that can act as a guide for a wire or cable so that anchors 30 can be installed while the wire or cable is connected to the anchor 30. Channel 38 will also allow access of a screwdriver to remove an anchor that has jammed in the slot 34 from an impact or if the anchor is defective. In another embodiment, the channel 38 continues across the top of head 14 so that the channel 38 is on both sides of key anchor slot 34 to accommodate a wire or cable.

A tapered longitudinal channel 40 that is preferably contiguous with the channel 38 is also present on at least one side to permit the user to view the position of the anchor 30 at the tip of the head 14 when the apparatus 10 is in a generally vertical position to facilitate the insertion of the anchor 30 into a pre-drilled hole. The final position of the set anchor 30 can also be viewed from below. The preferred angle of the tapered channel 40 taken from the side of the anchor head 14 is between approximately five degrees and approximately fifteen degrees with approximately ten degrees being particularly preferred.

If the exterior of the anchor is threaded, the channel 40 permits the user to view and locate the point of anchor placement on a beam or other structure as well as the progress of the advancement of anchor to its final position. The view permitted by the channel 40 helps to avoid missing the pre-drilled hole and knocking the anchor 30 out of alignment. The presence of the channel 40 in head 14 greatly improves the efficiency of the placement of the anchor 30 because the apparatus 10 can remain essentially vertical while the anchor 30 is placed and can be viewed from ground level so that the anchor placement is by sight rather than by estimation. The apparatus may also have means for illuminating the surface substrate such as light emitting diodes or bulbs (not shown) to assist the user in the placement of the anchor.

Once the anchor 30 is placed in the prepared hole, handle 22 is brought sharply against the upper stop 20 such that the force is transmitted along base pole 12 to head 14 and forces the anchor 30 to be inserted as well as to expand to engage the interior of the hole depending on the type of anchor selected. The impacts are repeated several times until the anchor 30 is set and can bear a load. Thereafter, a new anchor 30 is inserted into the slot 34 and placed into a new hole and set in place with the handle 22 driving the apparatus 10 to set the anchor 30.

Figure 5:
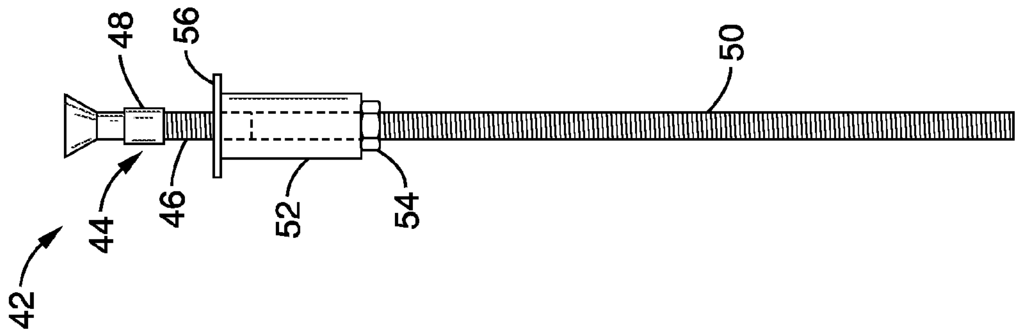
FIG. 5 is a side view of one anchor insert assembly with a threaded rod and connectors for use with one embodiment of the invention.
Figure 6:
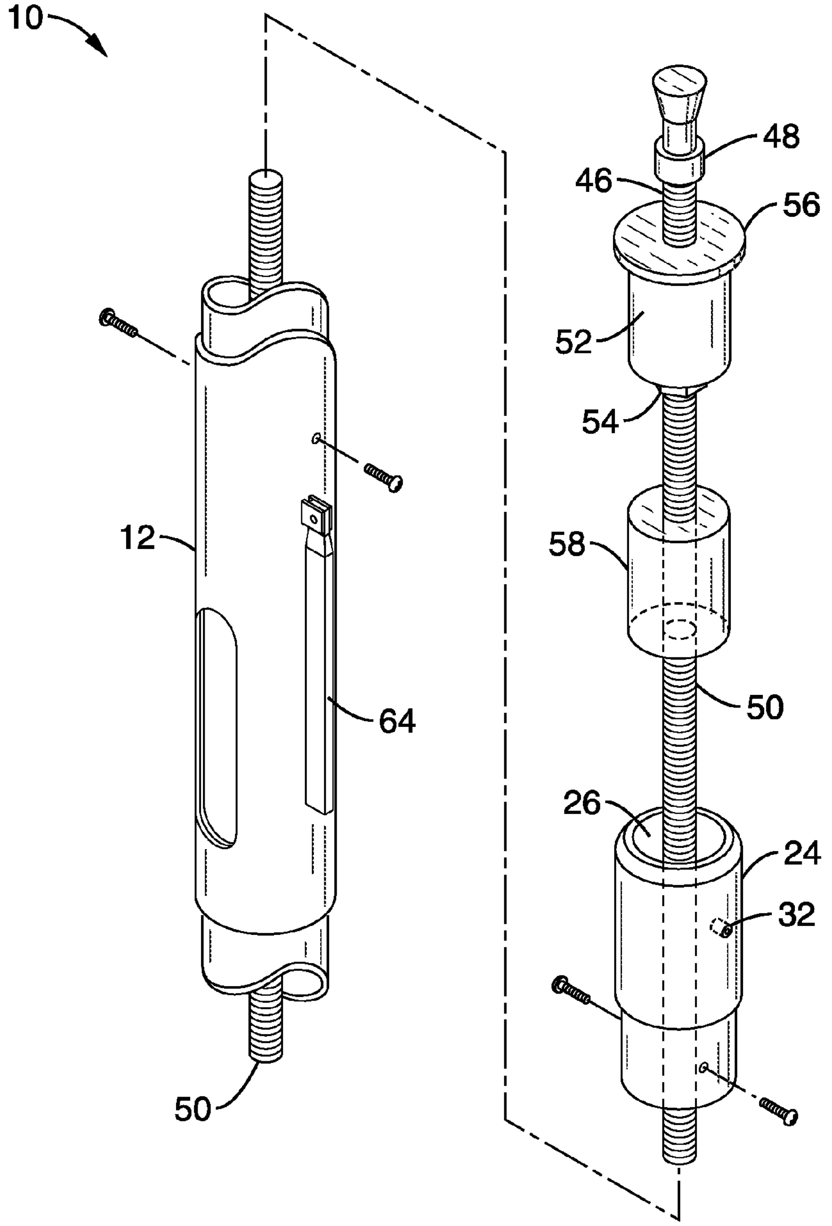
FIG. 6 is an exploded view of the head of a second embodiment of the invention adapted for mounting threaded rod and impact anchor assemblies according to the invention.

Turning now to FIG. 5 through FIG. 6, another embodiment of the apparatus 10 is shown that is configured for the installation of an externally threaded wedge anchor that is coupled to a threaded rod as a single unit. The threaded rod assembly 42 is used to illustrate the variety of anchor systems that can be installed using the apparatus 10. Although an “all thread” rod is shown as an illustration, it will be understood that the apparatus can be used with linear work pieces of different cross-sectional shapes and sizes.

FIG. 5 shows a typical assembly 42 used for anchoring suspended ceilings structures or other structures from concrete ceilings with pre-existing anchor holes. The assembly shown in FIG. 5 has an impact anchor 44 that has a threaded shaft 46 and a body with an expandable section 48 that engages the walls of a hole. A threaded rod 50 is coupled to the threaded shaft 46 of the impact anchor 44 with a threaded sleeve or long nut 52 with suitable interior threads to accommodate both the anchor 44 and the threaded rod 50. Optionally, a second nut 54 can be used to limit and lock the rotation of the long nut 52 or threaded rod 50 due to vibrations or other forces after installation. A washer 56 may also be on top of long nut 52 and retaining anchor 42 that is used to distribute forces and to keep the long nut 52 from unintended rotation.

The apparatus 10 shown in FIG. 6 is configured for installation of assemblies such as shown in FIG. 5 that may have a sleeve or long nut 52 or other means for joining a threaded rod to an anchor. The body 12 of the apparatus 10 has an insert that fits in the quick coupling 24. The collar insert 58 of FIG. 6 is tubular and sized on the outside to fit the interior 26 of the coupling 24 and sized with an inside diameter to be larger than the diameter of the threaded rod 50 but smaller than the diameter of the long nut 52 so that it will not pass through the collar insert 58. The interior of the insert 58 and coupling 24 and the corresponding pole body 12 are open or hollow in order to accommodate threaded rods 50 of varying lengths. The length of the threaded rod 50 could also be as long as the approximate length of the extended pole 12.

The threaded long nut 52 or the nut 54 are greater in diameter that the diameter of the interior bore of collar insert 58 so that the threaded rod 50 and wedge anchor 44 combination will not fall down the interior of the insert 58 and pole body 12. In addition, the collar insert 58 transfers the impact forces through the long nut 52 or nut 54 to the anchor 44 when the handle 22 is brought against the top stop 20 to set the anchor 44. The collar insert 58 is preferably composed of steel or other metal so that the energy can be efficiently transferred from the pole body 12 to the wedge anchor 44 during use.

FIG. 6 is an exploded view of the distal end of the pole body 12 with the coupling 24 and collar insert 58 and anchor assembly expanded out to show the pieces. In the embodiment shown, the all thread rod 50 is joined to a wedge anchor shaft 46 with a threaded sleeve/long nut 52. The threaded sleeve 52 may also be sandwiched on either side by a nut 54 and a washer 56. The collar insert 58 would be secured within the interior 26 of coupling 24 with a screw 32 or other means and the bottom nut 54 of the anchor assembly would be engaged with the collar insert 58 during use in the embodiment shown.

Figure 7:
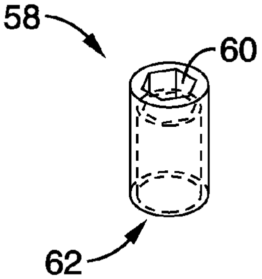
FIG. 7 is a side elevation view of an alternative embodiment of the collar insert with a socket.

In another embodiment, shown in FIG. 7, the top of the collar insert 58 has a socket 60 that is configured to receive either a nut 54 or the threaded sleeve 52 that has a suitable corresponding exterior shape. The shape of the socket is preferably hexagonal to match the typical shape of nuts 54 or long nuts 52 but can also have any geometrical shape. In another embodiment, the collar insert 58 is adapted to receive an interchangeable socket wrench with a hollow central core. The socket wrenches can be of various sizes.

The collar insert 58 is generally tubular with a central opening 62 that allows the threaded rod 50 of the anchor assembly to pass through. The nut 54 or sleeve/long nut 52 of anchor assembly fits within the socket 60 and the anchor of the assembly is thereafter inserted into the pre-drilled hole. The anchor is set with the sliding impacts of the handle 22 against the stop 20 and the force is transferred to the anchor through the collar insert 58 to the nut 54 or sleeve/long nut 52 causing the anchor to expand and engage the walls of the pre-drilled hole.

Rotation of the pole 12 after impacting and setting the threaded wedge anchor will advance the threaded sleeve 52 and the nut 54 drawing the sleeve along the threaded shaft 46 of the wedge anchor and the optional washer 46 to the horizontal surface of the ceiling. If necessary, the sleeve/long nut 52 and the optional nut 54 could be loosened or removed from the threaded shaft 46 of the anchor by the counter clockwise rotation of the pole body 12.

The threaded sleeve 52 can also have a round cross-section and the socket 58 can engage and advance nut 54 along the threaded rod 50 to lock or restrict the motion of the threaded sleeve 52 after installation due to vibrations or motion of the assembly so that any "play" in the anchor assembly can be controlled.

Other types of wedge anchors than those shown in FIG. 5 and FIG. 6 can be used that do not require an impact but use a wedge attached to a threaded shaft to expand the body of the anchor against the walls of the hole to secure the anchor. A nut is advanced along the threaded shaft by rotation causing the wedge at the base to be drawn into the anchor body causing the body to expand against the walls of the hole in this type of anchor. When this type of anchor is used in the anchor assembly, rotation of the threaded sleeve/long nut 52 will cause the anchor 44 to set within the hole.

The impact forces of the apparatus can also be used in combination with the rotation of the pole body 12 in some anchoring systems. For example, adhesive packets placed in the pre-drilled holes may be punctured with the impact of the anchor to release the adhesive and the anchor is set by rotation of a nut to expand the anchor.

Similarly, placement of an expandable body within a pre-drilled bore with impacts with the handle followed by rotation of the body to turn the head of a bolt or a nut to expand the body in the bore can be accomplished with one tool and with one step from ground level.

In one embodiment, an optional bar 64 is provided to the pole body 12 preferably below the bottom stop 18 that is perpendicular to the central axis of the body 12 to increase the mechanical advantage of the user during axial rotation of the body 12. The greater torque that can be exerted with the use of the bar will speed up the time of installation and increase the efficiency of the activity. In another embodiment the bar can fold down to be parallel with the body 12 as shown in FIG. 6 or can be removed completely. In another embodiment, the bar is a shaft with threads that is screwed into a nut welded into body 12.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for installing overhead anchored structures, comprising:

an extendable tubular housing with a proximal end and a distal end;

a coupling on the distal end of said tubular housing;

an anchor head reversibly coupled with said coupling, said anchor head configured to hold an anchor for placement in a pre-drilled hole in a substrate;

an end cap at the proximal end of said tubular housing; and means for imparting force longitudinally on said anchor head wherein an anchor is placed in a pre-drilled hole in a substrate;

said anchor head having at least one longitudinal tapered channel and an anchor receptacle;

wherein said tapered channel of said anchor head has a taper angle of between approximately five degrees and approximately fifteen degrees.

2. An apparatus as recited in claim 1, wherein said means for imparting force comprises:

a slidable member; and a stop mounted to said tubular housing, wherein said slidable member is configured to slide linearly along an outside surface of the tubular housing and impact said stop.

3. An apparatus as recited in claim 2, further comprising a second stop mounted to said tubular housing configured to stop the linear sliding of said slidable member in the direction of the proximal end of said housing.

4. An apparatus as recited in claim 2, wherein said slidable member further comprises weights mounted to said slidable member to increase the impact force of the slidable member upon impact with said stop.

5. An apparatus as recited in claim 1, wherein said anchor head further comprises:

means for temporarily securing an anchor with said anchor head for insertion into a pre-drilled hole.

6. An apparatus as recited in claim 5, wherein said means for securing and anchor comprises:

a resilient finger frictionally engaging an anchor disposed within a slot in said anchor head.

7. An apparatus as recited in claim 1, further comprising a hemispherical end cap at the proximal end of said extendible tubular housing.

8. An apparatus as recited in claim 1, further comprising an arm, said arm extending perpendicularly to a long axis of said extendible tubular housing.

9. An apparatus for installing overhead anchored structures, comprising:

an elongate tubular housing with a proximal end and a distal end;

a coupling on the distal end of said tubular housing;

an anchor head reversibly coupled with said coupling, said anchor head having at least one longitudinal tapered channel and an anchor receptacle;

a slidable member; and a stop mounted to said tubular housing, wherein said slidable member is configured to slide linearly along an outside surface of the tubular housing and impact said stop;

wherein said tapered channel of said anchor head has a taper angle of between approximately five degrees and approximately fifteen degrees.

10. An apparatus as recited in claim 9, wherein said anchor head further comprises:

a resilient finger configured to frictionally engage an anchor disposed within said anchor receptacle within said anchor head.

11. An apparatus as recited in claim 9, further comprising a hemispherical end cap at the proximal end of said elongate tubular housing.

* * * * *